United States Patent
Suntsova et al.

(10) Patent No.: US 10,065,731 B2
(45) Date of Patent: Sep. 4, 2018

(54) VIBRATION-HARVESTING, VARIABLE-STIFFNESS SYSTEM AND METHOD

(71) Applicant: The Boeing Company, Chicago, IL (US)

(72) Inventors: Sofya A. Suntsova, Philadelphia, PA (US); Christopher J. Felker, Downingtown, PA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/694,914

(22) Filed: Apr. 23, 2015

(65) Prior Publication Data

US 2016/0312847 A1 Oct. 27, 2016

(51) Int. Cl.
*B64C 27/00* (2006.01)
*F16F 15/00* (2006.01)

(52) U.S. Cl.
CPC .......... *B64C 27/001* (2013.01); *F16F 15/002* (2013.01); *F16F 2224/0283* (2013.01); *F16F 2228/066* (2013.01)

(58) Field of Classification Search
CPC ........ F16F 15/00; F16F 15/005; F16F 15/007; F16F 15/02; F16F 2224/0283; F16F 2224/0258; F16F 2228/006; F16F 2228/06; F16F 2228/066; B64C 27/001; B64C 27/002; B64C 27/004; B64C 2220/00
See application file for complete search history.

(56) References Cited

U.S. PATENT DOCUMENTS

| | | | | |
|---|---|---|---|---|
| 5,857,694 A | * | 1/1999 | Lazarus | A63B 60/46 280/602 |
| 6,048,276 A | * | 4/2000 | Vandergrift | A63B 53/08 310/326 |
| 6,872,433 B2 | | 3/2005 | Seward et al. | |
| 6,882,086 B2 | * | 4/2005 | Kornbluh | B60G 17/01941 310/328 |
| 6,986,521 B1 | * | 1/2006 | Li | B62K 3/04 280/281.1 |
| 7,360,996 B2 | * | 4/2008 | Driver | F03D 1/0658 416/226 |
| 7,529,154 B2 | * | 5/2009 | Cole | F16F 15/005 310/326 |
| 7,678,440 B1 | | 3/2010 | McKnight et al. | |

(Continued)

OTHER PUBLICATIONS

Leinonen et al., "Piezoelectric energy harvesting for powering low pwoer electronics", 2009, Energy research at the University of Oulu. Proceedings of the EneProconference Jun. 3, 2009, p. 105-109.*

(Continued)

*Primary Examiner* — Thomas J Williams
(74) *Attorney, Agent, or Firm* — Parsons Behle & Latimer

(57) ABSTRACT

A system for modifying a stiffness of a structure of a vehicle using vibrational energy of the vehicle includes a variable-stiffness layer, having a selectively controllable Young's modulus, attached to the structure, and a conversion layer, coupled to the variable-stiffness layer, the conversion layer configured to convert vibrational energy from the structure into electrical energy, and to supply the electrical energy to the variable-stiffness layer to adjust a stiffness of the variable-stiffness layer.

19 Claims, 6 Drawing Sheets

(56) References Cited

U.S. PATENT DOCUMENTS

| | | | |
|---|---|---|---|
| 7,892,630 B1* | 2/2011 | McKnight | B32B 3/10 |
| | | | 428/114 |
| 8,087,499 B1 | 1/2012 | McKnight et al. | |
| 8,179,018 B2 | 5/2012 | Gao et al. | |
| 8,434,293 B2 | 5/2013 | Widdle, Jr. et al. | |
| 8,569,928 B2* | 10/2013 | Szwedowicz | F01D 5/16 |
| | | | 310/321 |
| 2013/0146821 A1 | 6/2013 | Meyer et al. | |
| 2015/0069687 A1* | 3/2015 | Dastoor | F16F 1/3615 |
| | | | 267/153 |

OTHER PUBLICATIONS

Samatham et al., Electroactive Polymers for Robotics Applications, 2007, Springer London, Chapter 1 "Active Polymers: An Overview", p. 9-44.*

"Veriflex". https://materia.nl/material/veriflex/.*

Mao, Y., Zhao, P., McConohy, G., Yang, H., Tong, Y., Wang, X. (2014). Sponge-Like Piezoelectric Polymer Films for Scalable and Integratable Nanogenerators and Self-Powered Electronic Systems. Adv.

* cited by examiner

VIBRATION-HARVESTING, VARIABLE-STIFFNESS SYSTEM AND METHOD

FIELD OF THE DISCLOSURE

The present disclosure relates generally to systems for dealing with mechanical vibration. More particularly, the present disclosure relates to a vibration-harvesting, variable-stiffness system that uses vibrational energy from a structural member to power a device for changing the stiffness of the structural member.

BACKGROUND

Many structures, such as vehicles, vibrate during operation. Further, each structure has a natural or resonant frequency that depends upon its shape or configuration. Structures of various types are frequently designed so that operational vibration does not match the natural frequency of the structure, so as to avoid natural or resonant frequencies. This is done to prevent damage to the structure, since a resonant frequency can focus mechanical energy into a specific location or part of the structure, and exceed the material strength of the structure at that location, potentially causing damage or failure.

One category of vehicles that are affected by this issue is aircraft, such as rotary wing aircraft (e.g. helicopters). Rotary wing aircraft are frequently subject to high vibration environments. Levels of vibration vary based on factors such as the rotor speed(s), environmental factors, and payload. Vibration levels, in turn, often determine or limit the size and weight of a given rotary wing aircraft, or limit rotor speeds during its operation. To deal with these issues, existing rotorcraft airframes are frequently stiffened by adding mass to the structure in order to avoid undesirable (e.g. resonant) frequencies of vibration. In the case of rotorcraft, the added mass can be significant—perhaps hundreds of pounds. Improved load-bearing materials can be helpful in addressing this issue, but generally do not, on their own, allow for a reduction in vibration tuning mass. Furthermore, addition of parasitic weight can restrict the speed and payload capabilities of the aircraft, yet it is generally considered more desirable to have a lighter weight aircraft to allow more payload and/or higher fuel efficiency.

In addition to the selective addition of weight, another approach for avoiding natural or resonant frequencies is to only operate a vehicle within certain operational ranges, so that only certain vibrational frequencies are possible. However, this approach limits the utility of the vehicle.

The present application relates to one or more of the above issues.

SUMMARY

It has been recognized that it would be desirable to have a system that can control resonant vibrations in a structure that does not involve the addition of significant weight to the structure.

It has also been recognized that it would be desirable to have a system for controlling vibrations in a structure that can be self-powered.

It has also been recognized that it would be desirable to have a system for controlling vibrations in a structure that is easily controllable, and does not limit the operational utility of the structure.

In accordance with one embodiment thereof, the present application discloses a structure, including a structural member configured to bear a load, and a stiffness adjustment device coupled to the structural member. The stiffness adjustment device includes an electrically-powered variable-stiffness layer, and a conversion layer coupled to the variable-stiffness layer. The conversion layer is configured to convert vibrational energy from the structural member into electrical energy, and to supply the electrical energy to the variable-stiffness layer to adjust a stiffness of the variable-stiffness layer.

In accordance with another embodiment thereof, the present application provides a device for modifying a stiffness of a structure of a vehicle using vibrational energy of the vehicle. The device includes a variable-stiffness layer, having a selectively controllable Young's modulus, attached to the structure, and a conversion layer, coupled to the variable-stiffness layer, the conversion layer configured to convert vibrational energy from the structure into electrical energy, and to supply the electrical energy to the variable-stiffness layer to adjust a stiffness of the variable-stiffness layer.

In accordance with yet another embodiment thereof, the present application provides a method for assembling a structure that uses vibrational energy of the structure to change a stiffness of the structure. The method includes attaching a variable-stiffness layer to the structure, and coupling a conversion layer to the variable-stiffness layer. The conversion layer is configured to convert vibrational energy from the structure into electrical energy, and to supply the electrical energy to the variable-stiffness layer to adjust a stiffness of the variable-stiffness layer.

Figure 1:
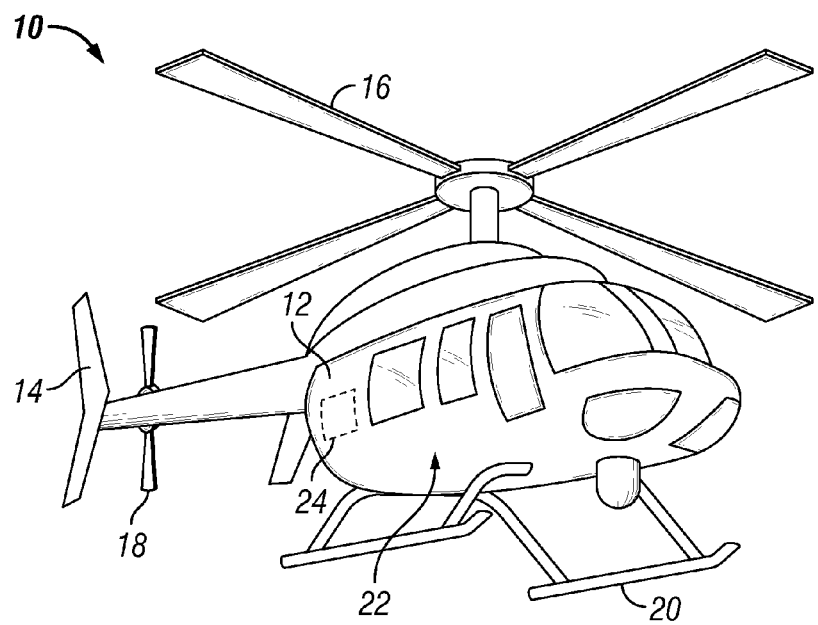
FIG. 1 is a perspective view of a rotary wing aircraft.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the disclosure as defined by the appended claims.

DETAILED DESCRIPTION

As noted above, vibration levels in rotary wing aircraft can dictate or limit the size and weight of the aircraft, and stiffening the airframe by adding mass to the structure does not necessarily allow for a reduction in vibration tuning mass, and can add parasitic weight that restricts speed and payload capabilities of the aircraft.

Shown in FIG. 1 is a perspective view of a rotary wing aircraft 10. This aircraft 10 generally includes a main fuselage portion 12, a tail portion 14, with a main rotor 16 above the main fuselage 12 and a tail rotor 18 attached to the tail portion 14. The aircraft 10 also includes landing gear 20, in this case, skid-type landing gear that are common on many helicopters. The various fuselage portions 12, 14 are covered in an aircraft skin, generally indicated at 22. A specific region of the skin 22 is indicated in a dashed outline 24 in FIG. 1.

One challenge associated with aircraft, particularly rotary-wing aircraft, is vibration, especially the possible production of resonant or natural frequencies of vibration that can cause significant damage to the airframe, skin or other components. Advantageously, a vibration-harvesting, variable-stiffness system has been developed that uses vibrational energy from a structural member to change the stiffness of that structural member. This system can tune the stiffness of a structure by applying a self-powered, controlled dynamic stiffness material that is either bonded to the outside of the structure or embedded within a laminate. This allows for the weight and the size of a structure to be designed independently of vibration levels. Possible application locations on an aircraft include the fuselage structure, including the aircraft skin, frames, stiffeners, beams, decks, etc. Other aircraft applications include rotor blades of rotary wing aircraft, landing gear and drive trains.

Figure 2:
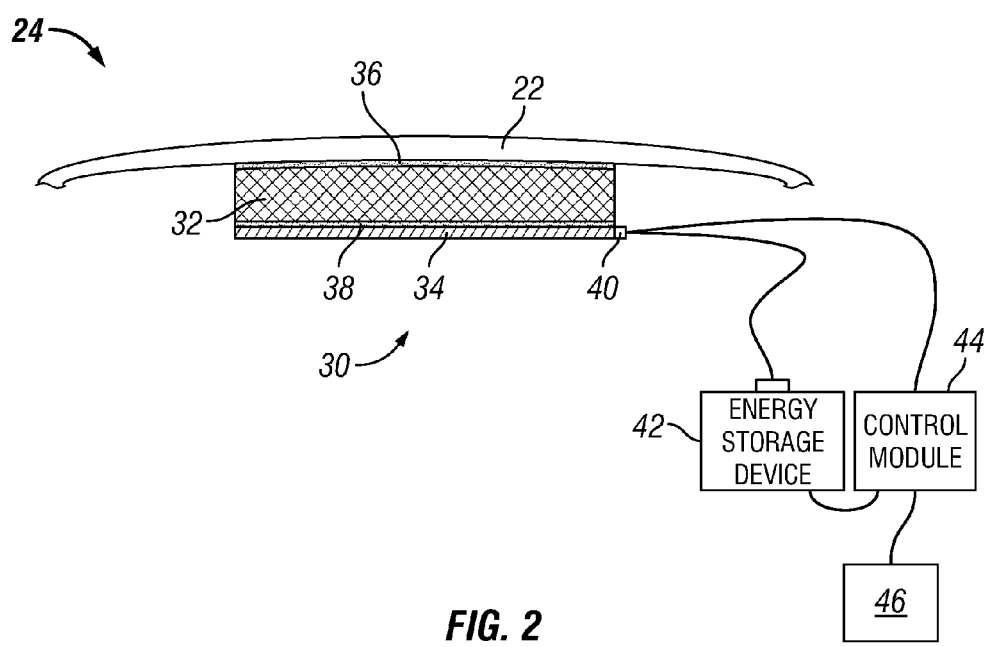
FIG. 2 is a cross-sectional view of a portion of an aircraft skin provided with an embodiment of a vibration-harvesting, variable-stiffness system in accordance with the present disclosure.

One portion of a rotary wing aircraft that is particularly susceptible to vibrational damage is the aircraft skin, such as the outlined skin portion 24 shown in FIG. 1. A cross-sectional view of this skin portion 24 is shown in FIG. 2. Advantageously, this skin portion 24 is provided with an embodiment of a vibration-harvesting, variable-stiffness system in accordance with the present disclosure, shown schematically and indicated generally at 30. It is to be understood that in FIGS. 2-3D the some of the physical elements of this system 30 are shown exaggerated in size or thickness for illustrative purposes. In an actual installation, the size, shape or appearance of the various elements of the system 30 may vary from that shown in the figures.

In the embodiment shown in FIG. 2, the vibration-harvesting variable-stiffness system 30 includes three layers (other than the adhesive layers described below): a primary load-bearing structure 22 (in this case an aircraft skin panel), a variable-stiffness layer 32, and a vibration harvesting and energy conversion layer 34. For simplicity, the vibration harvesting and energy conversion layer 34 is frequently referred to herein as simply the "conversion layer." The variable-stiffness layer 32 is attached to the primary load-bearing structure, and the vibration harvesting and energy conversion layer 34 is attached to the variable-stiffness layer 32. The variable-stiffness layer 32 can be bonded to the surface of the structural member 22 via a first adhesive or applique layer 36, and the vibration harvesting and energy conversion layer 34 can attached to the variable-stiffness layer 32 via a second layer 38 of adhesive or applique. The variable-stiffness layer 32 and the energy conversion layer 34 attached together can be referred to as a variable-stiffness device. Other attachment methods can also be employed. Additionally, for example, a variable-stiffness device having this general configuration can continuously cover the surface of a structural member (e.g. an aircraft skin) or comprise discrete devices at particular locations on a surface where it is desirable to control stiffness.

The vibration harvesting and energy conversion layer 34 is provided with an electrode 40, which is electrically coupled to an energy storage device 42, which can be a capacitor, and also to a control module 44, which is discussed in more detail below. The control module 44 can, in turn, be electronically and communicatively coupled to an external electronic and computer system 46, such as an aircraft computer system, as described in more detail below.

The primary load bearing structure 22 can be any type of structure that experiences or is expected to experience mechanical vibration. While an aircraft application is shown herein, virtually any type of structure can be provided with a vibration-harvesting variable-stiffness system 30 in accordance with the present disclosure. In the present embodiment, the structure is a skin 22 of an aircraft. This skin can be of composite laminate, metallic or any other suitable material. Without the variable-stiffness properties imparted by the system 30, the primary load-bearing structure 22 might otherwise be configured with increased size and weight (e.g. greater thickness, stiffness, etc.) in order to withstand anticipated vibration levels and provide a desirable frequency response. Advantageously, the system 30 disclosed herein can reduce or eliminate the need for such.

The vibration-harvesting and energy-conversion layer 34 can be a piezoelectric material, such as a mezoporous piezoelectric nanogenerator (MPN) film. This film layer 34 serves two functions in the system: it harvests mechanical energy from vibration of the structure 22, and converts this vibration into electrical energy. Electrical energy from the energy-conversion layer 34 is collected through the electrode 40, and stored by the energy storage device 42. This energy can then be directed via the control module either back to the vibration-harvesting variable-stiffness system 30, or to the external electronic and computer system 46, as described in more detail below.

The variable-stiffness layer 32 is of a variable-stiffness material, that is, a material that is configured to change stiffness when electrical energy is supplied to it through the surface of the energy conversion layer 34 (e.g. piezoelectric film). Any material that has the ability to change its stiffness with the application of an electric charge can potentially be used for the variable-stiffness material. For example, the variable-stiffness material can be a Shape Memory Polymer (SMP), a Redox Stimulated Variable Modulus Material (RSVMM), and/or any other suitable material having an adjustable Young's modulus, whether now existing or later developed. These various materials are types of stimulus-responsive variable-stiffness materials that change stiffness in response to an electric current. In this particular application the material of the variable-stiffness layer 32 is stimulated by an electric charge provided directly from the surface of the energy conversion layer 34.

The range of stiffness of the variable-stiffness material and its time-based response to the electrical stimulus can vary. As noted above, one type of stiffness-changing material that can be suitable is a Redox Stimulated Variable Modulus Material (RSVMM). In testing, one type of this material (e.g. $FeCl_2$ and $FeCl_3$) has been found to have a compressive strength that can transition from about 0.06 MPa to about 2.1 MPa with the application of an electric current. It is believed that strengths above 2.1 MPa can also be achieved by adjustment of the chemical composition of the material and surrounding conditions. The transition time for this change in stiffness can range from several seconds to several minutes, depending on the particular RSVMM material.

Another type of material that can be suitable for the variable-stiffness material is a Shape Memory Polymer (SMP). One example of SMP material that can be used in this application is called Veriflex®, and was developed by Cornerstone Research Group, Inc. of Beavercreek, Ohio. In one configuration, the Veriflex material has been found to have a stiffness that ranges from about 1 MPa to about 3 MPa, with the application of an electric charge. The activation energy varies depending on the thickness and chemical makeup of the material, and typically ranges from about 0.5 V to about 40 V, and the activation time can be as low as several seconds, depending on the current and voltage. Through its connection to the structure 22, the stiffness of the variable-stiffness layer 32 is transferred to the structural member 22 to change the stiffness of the structural member 22, which changes how the structural member responds to vibrations and vibrational frequencies.

In FIG. 2 the aircraft skin panel 22, the variable-stiffness layer 32 and the energy conversion layer 34 are shown exaggerated in thickness for illustrative purposes. Additionally, the thickness of the various layers will depend on the particular material that is selected for each. For example, where either SMP or RVSMM materials are used for the variable-stiffness layer 32, this layer can be from 0.05 in. to about 5 in. thick. More particularly, RVSMM material having a thickness of about 2.5 cm have been tested. The thickness can be varied based on the desired application and can be as thin as a thin film (e.g. 0.05 in. thick), and as thick as, for example, a stiffener on the frame of an aircraft (e.g. about 2-5 in. thick).

The thickness of the energy conversion layer 34 will also vary depending on the particular material that is chosen. Mesoporous piezoelectric polymer (PVDF) thin film materials that have been developed are believed to be a suitable material for the energy harvesting/converting layer 34. This type of material is also referred to as a Mesoporous Piezoelectric Nanogenerator or MPN. For the use of MPN film for the energy conversion layer 34, layers of this material having a thickness of about 28 µm and a size of 2 cm×1 cm have been tested, and have been found to produce from 0 V to 11 V. The thickness of this layer can be increased (either of the material itself or by the addition of multiple layers) based on the requirements of the electric charge. Voltage output can be modified by varying the thickness and area of the material, and by varying the amount of voids in the material created by the ZnO nanoparticles used in its formation.

Those of skill in the art will recognize that the thickness of the underlying structure 22 can vary widely, depending on the specific application of the system 30 and the materials of the structure. As a general matter, though it is not limited to this application, the system 30 is considered likely to be applied to relatively thin structures 22, which are more susceptible to negative effects from resonant frequencies of vibration. Where the structure 22 is an aircraft skin panel, for example, its thickness will depend upon its materials of construction (e.g. metal vs. composite). Metal skin panels are likely to have a thickness in the range of 0.04 in. to 1 in., while carbon fiber composite skin panels are likely to have a thickness in the range of 0.02 in. to 0.5 in. Those of skill in the art will recognize that the system and method disclosed herein can be used with other materials and thicknesses of the underlying structure 22, and the present disclosure is not to be construed as limiting these in any way.

Figure 3A:
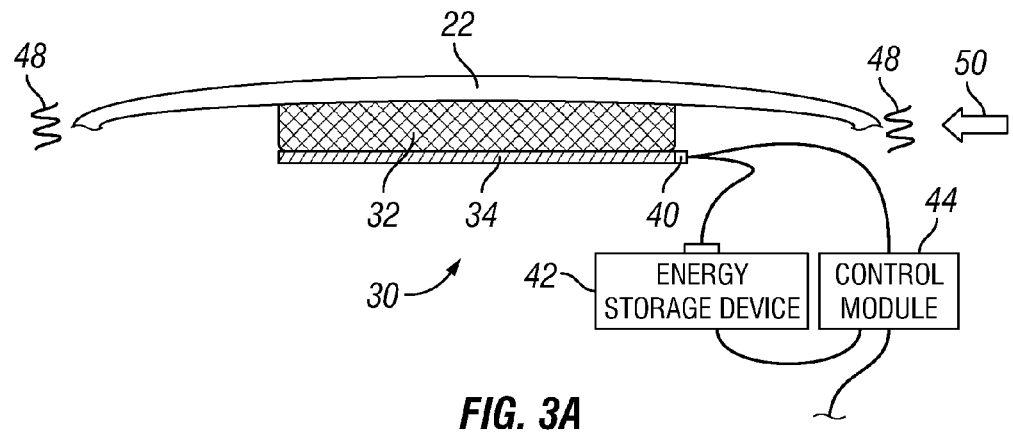
FIGS. 3A-3D are cross-sectional views of an embodiment of a vibration-harvesting, variable-stiffness system in accordance with the present disclosure, showing the mode of its operation.
Figure 3B:
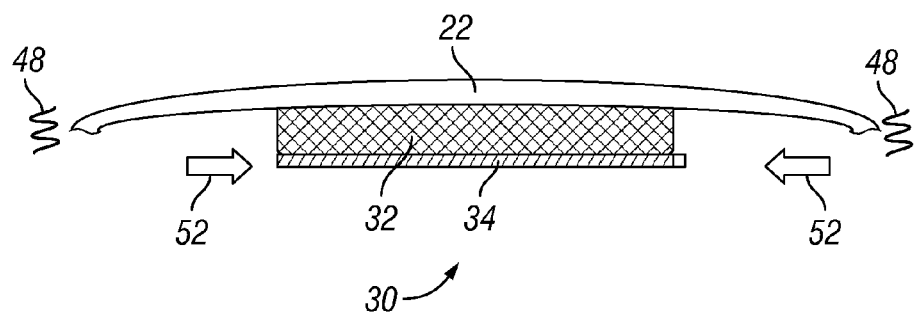

Operation of the system 30 is illustrated in FIGS. 3A-3D. Except as specifically noted, the system shown in FIGS. 3A-3D is intended to be the same as that shown in FIG. 2, though some elements, such as the adhesive layers 36 and 38, are not shown in all of these views. As shown in FIG. 3A mechanical energy, indicated by the arrow 50, is transmitted into the structure 22, causing it to vibrate, as indicated at 48. In a rotary wing aircraft, the vibrational energy is largely initiated by the rotor. In other applications, the vibration can originate from various sources. As shown in FIG. 3B, this mechanical vibrational energy is transmitted to the energy harvesting layer 34, as indicated by arrows 52. The energy conversion layer is configured to harvest vibrational energy from the structural member and convert the vibrational energy into electrical energy. Since the energy conversion layer 34 is directly connected to the variable-stiffness layer 32, and not directly connected to the structure 22, it vibrates in response to mechanical energy transmitted through the variable-stiffness layer 32. The energy conversion layer 34 thus generates energy from vibration of the structure 22 and/or the variable-stiffness layer 32. As discussed above, the energy conversion layer 34 can be a piezoelectric material and/or a mezoporous piezoelectric nanogenerator (MPN) film, or any other suitable material.

Figure 3C:
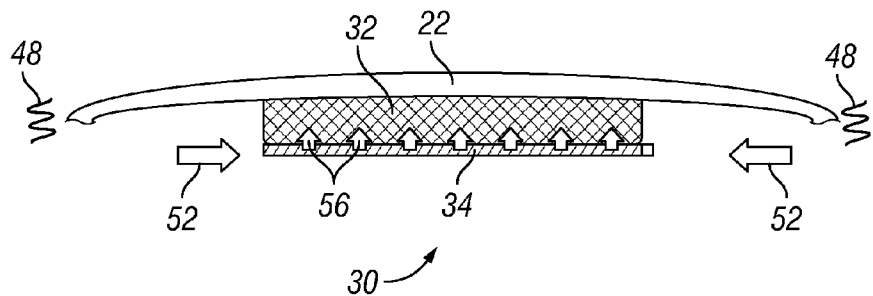

As shown in FIG. 3C, the energy harvesting layer 34 (e.g. an MPN film) harvests the mechanical vibrational energy and converts it to electricity, which can flow directly into the variable-stiffness layer 32, as indicated by arrows 56. With this energy, the variable-stiffness layer 32 (e.g. SMP or RSVMM material) is activated, and becomes stiffer. The electrical energy from the vibration-harvesting and energy-conversion layer 34 is thus transmitted into the variable-stiffness layer 32, resulting in a change in stress level between the variable-stiffness layer 32 and the load-bearing layer or structure 22. In the case of an SMP or RSVMM variable-stiffness layer 32, an electric charge applied to the variable stiffness layer 32 changes the elastic modulus of the material of that layer. The overall Young's modulus of the bonded structural layer 22 and the variable-stiffness layer 32 is thus altered, changing the resonant frequency of the primary load bearing structure 22 and thereby reducing or at least changing the frequency of vibrations in the immediate region of the variable-stiffness system 30. A structure with this variable-stiffness system can thus avoid natural frequencies without the need for added material. A continuous flow of electrical energy is provided to the variable-stiffness layer 32 to maintain its increased stiffness. When the electrical energy is removed, the variable-stiffness layer reverts to its initial stiffness state.

Figure 3D:
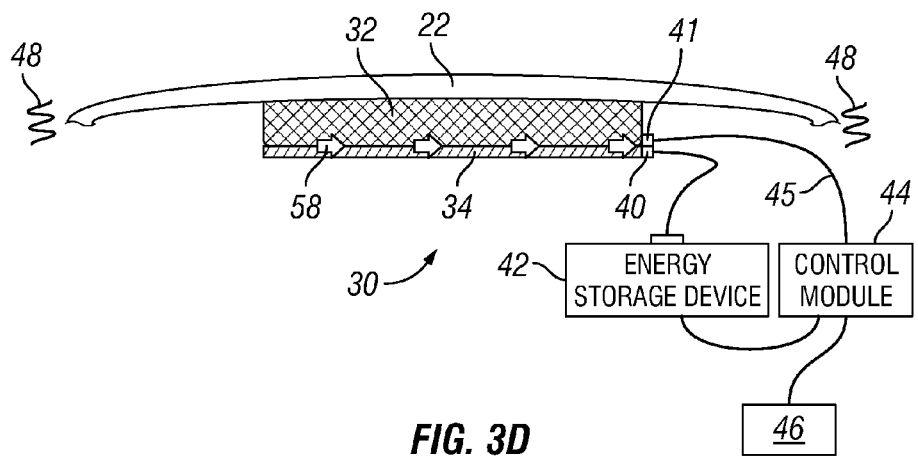

After the variable-stiffness layer 32 is activated, energy harvested by the energy harvesting layer 34, indicated by arrows 56 is used to keep the material of the variable-stiffness layer 32 activated, as shown in FIG. 3C. Additional electric current that is in excess of that needed for the system 30 can be directed to power other electric systems, such as an external electronic and computer system 46. This feature is depicted in FIG. 3D. The excess electricity, indicated by arrows 58, can flow via the electrode 40 to the energy storage device 42 (e.g. capacitor), and provide power for operation of a control module 44, which can be a computer controller-type device. The control module 44 can thus draw electrical energy from the energy storage device 42 and transmit this energy to an external electronic system 46, which can be an aircraft computer system or the like, as discussed above. The control module 44 can be configured and programmed to condition and regulate this transmission of excess power from the variable-stiffness system 30.

Alternatively, the control module 44 can be configured for controlling the flow of all energy to the variable-stiffness layer 32, whether there is excess energy produced by the energy conversion layer 34 or not. Referring still to FIG. 3D, the energy produced by the energy conversion layer 34, indicated by arrows 58, can flow to the energy storage device 42 via the electrode 40, as discussed above. This energy, representing all energy produced by the energy conversion layer 34 (not just excess energy), is stored by the energy storage device 42, and also powers the control module 44. During normal operation of the system 30, the control module 44 can control and condition the flow of energy from the energy storage device 42 to the variable-stiffness layer 32 via a power line 45 and second electrode 41. The energy conversion layer 34 can thus provide electrical energy to the variable-stiffness layer 32 and/or an electrical system 46 associated with the structure 22.

In this configuration, the control module 44 controls where the electrical energy from the energy conversion layer 34 flows, and/or how much electrical energy is supplied. For example, the control module 44 can control the flow of electrical energy from the energy conversion layer 34 to the variable-stiffness layer 32, and can apply a selected amount of electrical energy to the variable-stiffness layer 32 to achieve a selected stiffness of the variable-stiffness material. The control module 44 can also be configured to route at least a portion of the electrical energy from the variable-stiffness system 30 to the external electrical system 46, such as an electrical system of the vehicle or of the structure that forms part of the vehicle. If the electrical system 46 includes batteries (not shown), the extra electrical energy from the variable-stiffness system 30 can potentially allow the battery size to be reduced, thus saving weight.

Notably, the system 30 does not dampen the vibration of the structure as a whole. This system 30 stiffens the part of the structure to which it is attached, thereby avoiding a specific frequency, so that vibration in that area is reduced. However, the whole structure (e.g. an aircraft) will presumably still vibrate, thus providing enough energy to power the system 30, though the vibrational energy load will be redirected to follow a stiffer path. Thus, while the system harvests and converts vibrational energy into electrical energy, it does not dampen overall vibration of the structure, so that the energy conversion 34 layer is able to provide enough electrical energy to power the variable-stiffness material to achieve the desired stiffness.

The system 30 thus works in a dynamic loop, with its own feedback mechanism. If the energy conversion layer 34 does not experience sufficient vibration, the stiffness of the variable-stiffness layer 32 will drop, and vibration will increase, thus producing more energy, which will allow the stiffness of the variable-stiffness material to rise again. This feedback loop can enable the system to automatically adjust to a steady and possibly optimum state. One goal for design of this type of system in order to allow this feedback loop to direct the system to an optimum state is to configure the energy conversion layer 34 to supply enough energy to the variable-stiffness layer 32 even when the structure 22 and the attached variable-stiffness system 30 are in its stiffest condition. This can involve reducing the energy needed to generate enough electric current. An additional goal in the design of this sort of system is to reduce the activation time for the variable-stiffness material, so that the system 30 can work continuously. As yet another alternative, the energy storage device 42 can be used to store extra electric current that is generated when the system 30 first starts working (when vibrations will presumably be highest), and then, if needed, direct that stored energy back into the variable-stiffness layer 32.

Figure 4:
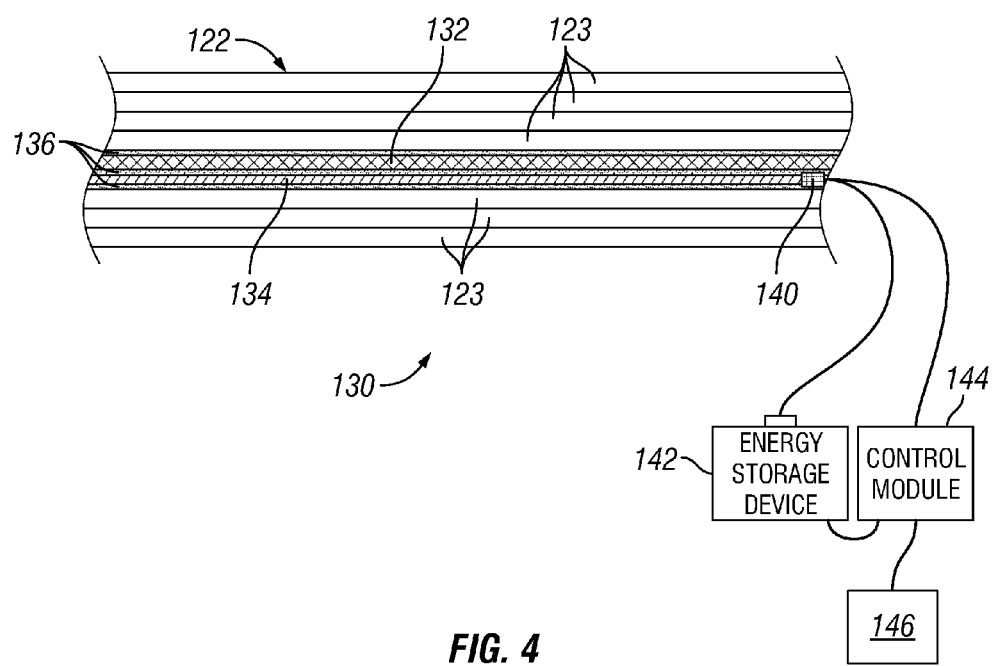
FIG. 4 is a cross-sectional view of an embodiment of a vibration-harvesting, variable-stiffness system in accordance with the present disclosure, in which the vibration-harvesting, variable-stiffness elements are embedded within a portion of a structural member.

The vibration-harvesting, variable-stiffness system 30 shown in FIGS. 2-3D is shown attached to a surface of a structure 22, such as an aircraft skin. It is to be appreciated that this is only one of many possible configurations. Alternatively, the device can be embedded in the structural member. Shown in FIG. 4 is a cross-sectional view of another embodiment of a vibration-harvesting, variable-stiffness system 130 in which the vibration-harvesting and variable-stiffness elements are embedded within a portion of a structural member 122. This system 130 includes a primary load-bearing structure 122 having a plurality of bonded layers or plies 123. In an exemplary application, the structure 122 can be a multi-ply carbon fiber composite panel or fiberglass composite structure, such as of an aircraft fuselage.

A variable-stiffness layer 132 and a vibration harvesting and energy conversion layer 134 are embedded at a selected location within the layers 123 of the structure 122, placing these elements within the structure 122, rather than upon an outer surface of it. The variable-stiffness layer 132 is attached to the energy conversion layer 134 via an adhesive layer 136, and both of these layers are attached to adjacent plies 123 of the structure 122 with additional layers of adhesive 136.

As in the embodiments discussed above, the variable-stiffness layer 132 can be any suitable material that has a controllable variable-stiffness, such as a Shape Memory Polymer (SMP) or Redox Stimulated Variable Modulus Material (RSVMM). The energy harvesting layer 134 can be a Mesoporous Piezoelectric Nanogenerator film (MPN). The energy harvesting layer 134 is attached via an electrode 140 to an energy storage device 142 (e.g. a capacitor), which is coupled to a control module 144. The control module 144 can, in turn, be connected to an external electric system 146 associated with the structure 122. Like the system illustrated in FIG. 3D and discussed above, the energy storage device 142 and control module 144 can operate only to harvest and direct excess electrical energy from the variable-stiffness system 130, or they can operate to also control the flow of electrical energy to the variable-stiffness layer 132.

Where the structure 122 is a carbon fiber composite structure, the adhesive layers 136 can be similar to the layers of resin that are applied between the layers or plies 123 of the laminate structure 122 when the various layers are laid up prior to curing. In the configuration shown in FIG. 4, the variable-stiffness layer 132 and energy conversion layer 134 can be co-cured with the plies 123 of the structure 122, forming an integral laminated structure. Thus the energy-harvesting, variable-stiffness device can be laid up within the layers 123 of the panel 122, either continuously or discretely. By using the combination of these layers, the system 130 can change the stiffness of the structure 122 in real time, based on the vibration environment.

If desired, the energy-harvesting, variable-stiffness system 130 can be configured to change the stiffness in just one direction relative to the lay-up of plies 123 in the structure 122. In a composite structure, such as a carbon fiber laminate, each ply of carbon composite material has a specific fiber direction (usually noted in degrees: e.g. 0, 90, 45, −45, etc.), and each ply provides stiffness primarily that direction. The total layup usually includes plies oriented in all or most directions. The layup of each part is designed based on the loads the part is expected to experience and the orientation of each ply is tailored to provide a desired capability for specific loading conditions. If a layer or strips of variable-stiffness material in accordance with the present disclosure are added within a laminate adjacent to plies having a particular directional orientation, these variable-stiffness layers can provide increased stiffness in the direction of those plies. This can provide variable-stiffness in a selected direction for the laminate, thus responding to a selected loading condition.

Advantageously, this type of vibration tuning system can be used with any structure that vibrates, including ground, marine and air vehicles, bridges, etc. It is considered especially useful in aircraft, including rotary wing aircraft (e.g. helicopters). Using the vibration-harvesting, variable-stiffness system disclosed herein, in any of its embodiments, a structure can be tuned in real time by changing its stiffness without requiring external power. Accordingly, structures such as aircraft can be designed for a wider range of vibration levels, enabling different use parameters and potentially greater utility. For example, in the case of rotary wing aircraft, different rotor rpm and greater or different payloads can be accommodated. This can allow the rotor speed to be changed during flight, which is considered desirable. Changing the rotor speed changes the natural vibration of the rotorcraft. The system disclosed herein allows the stiffness of a portion(s) of the aircraft structure to vary to avoid the variable natural frequency.

Figure 5:
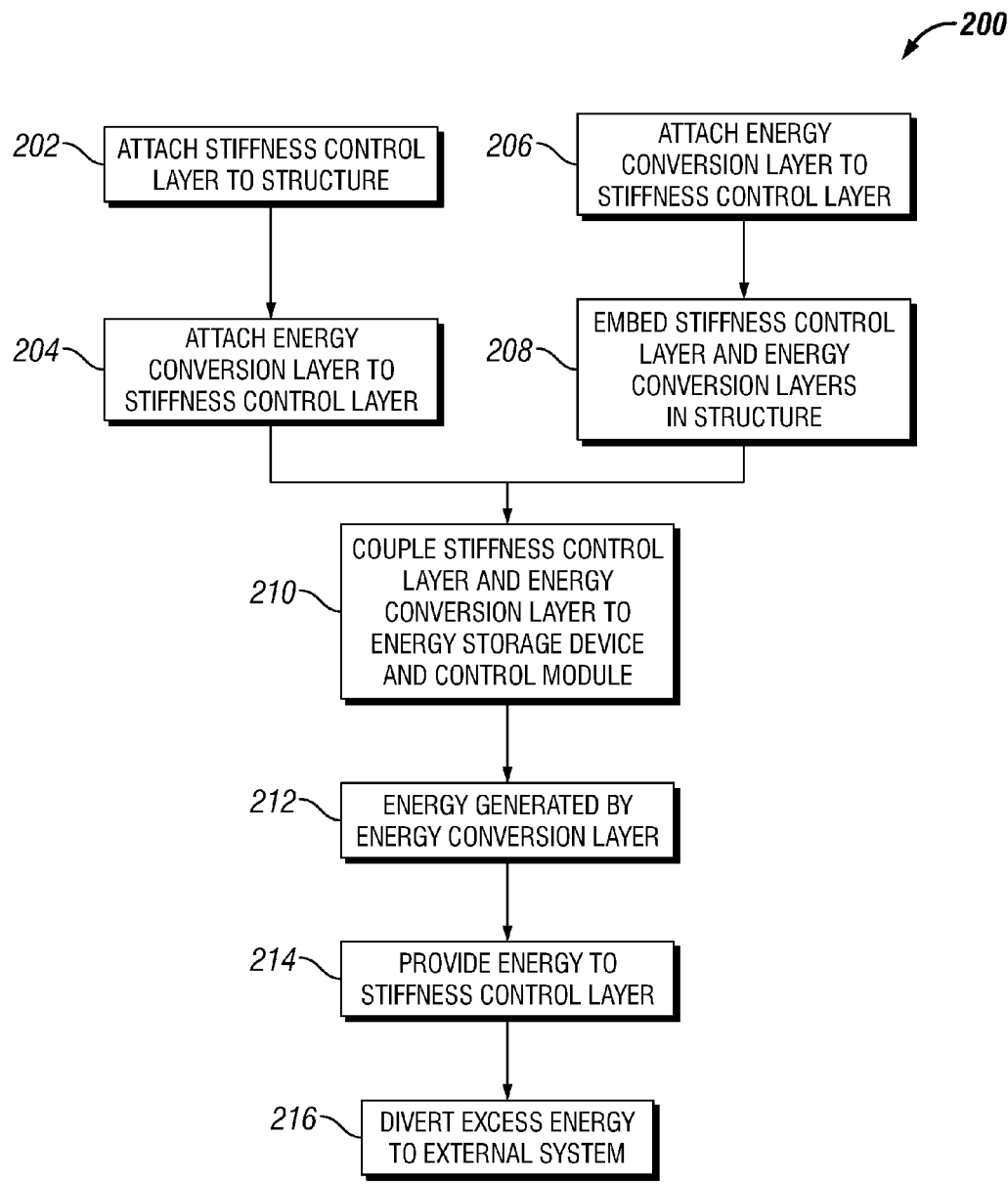
FIG. 5 is a block diagram of a method for method for assembling a structure that uses vibrational energy of the structure to change a stiffness of the structure.

Provided in FIG. 5 is a block diagram of a method 200 for assembling a structure that uses vibrational energy of the structure to change a stiffness of the structure, in accordance with the present disclosure. The method 200 generally includes attaching a variable-stiffness layer to the structure 202, and coupling or attaching a conversion layer to the variable-stiffness layer 204. It is to be appreciated that the order of these steps can be reversed from that shown. That is, the conversion layer and variable-stiffness layer can be attached to each other first, and the two connected layers can then be attached as a unit to the structure.

Attachment of the conversion layer and variable-stiffness layer to each other and to the structure can be done via adhesive, applique, or other suitable attachment method. Alternatively, as indicated by blocks 206 and 208, the first steps of the process can include attaching the energy conversion layer to the variable-stiffness layer 206, and embedding the attached layers in the structure 208. As used herein, the terms "attach" and "attachment" and similar terms used in association with connecting the energy conversion layer and variable-stiffness layer to the structure and/or to each other are intended to encompass any suitable method of mechanically connecting them, whether by embedding, attaching to or positioning on a surface, or other method of connecting.

The energy conversion layer and variable-stiffness layer can be configured as described above. For example, the conversion layer can be piezoelectric material, such as a mezoporous piezoelectric nanogenerator (MPN) film. The conversion layer converts vibrational energy from the structure into electrical energy, and supplies the electrical energy to the variable-stiffness layer to adjust a stiffness of the variable-stiffness layer.

The variable-stiffness layer and the energy conversion layer are then coupled to an energy storage device and a control module 210. Once connected in this manner, energy is generated by the energy conversion layer 212, and this energy is provided to the variable-stiffness layer 214. As discussed above, this can involve electricity flowing directly from the energy conversion layer into the variable-stiffness layer. Alternatively, the energy storage device can receive and store energy generated by the energy conversion layer 212, and the control module can control and provide a flow of this electrical energy to the variable-stiffness layer 214. Where excess energy is generated by the energy generation layer (i.e. the generated energy is not used by the variable-stiffness layer), the control module can divert this energy to an external system 216, in the manner discussed above.

The disclosure thus provides a vibration-harvesting, variable-stiffness system, and a method for making such a system. In one aspect, the disclosure can be viewed as describing a structure having a primary load bearing member (i.e. a structural member configured to bear a load), which is coupled to a stiffness adjustment device. In another aspect, the disclosure can be viewed as describing a stiffness adjustment device for a vehicle, which is powered by vibrational energy of the vehicle. In either description, the disclosure provides a system that includes a stiffness adjustment device having an electrically-powered variable-stiffness layer and a conversion layer coupled to the variable-stiffness layer. The conversion layer is configured to convert vibrational energy from the primary load bearing structural member into electrical energy, and to supply the electrical energy to the variable-stiffness layer to adjust or modify a stiffness of the variable-stiffness layer, which in turn can modify the vibration response of the primary load-bearing structure. The variable-stiffness layer can have a selectively controllable Young's modulus. This allows the system to change the stiffness of the structural member to avoid natural or resonant vibration frequencies.

This type of system can be used in a variety of applications, such as a wide variety of vehicles, including commercial and military aircraft, space vehicles, automobiles, railroad vehicles, marine craft (e.g. ships), possibly civil structures, wind turbines, etc. Any application where it is desirable to reduce the possible generation of resonant frequencies can potentially benefit from this system. In the case of aircraft, this system is believed to be particularly desirable because it can allow significant weight savings on existing and future aircraft platforms, both commercial and military.

Figure 6:
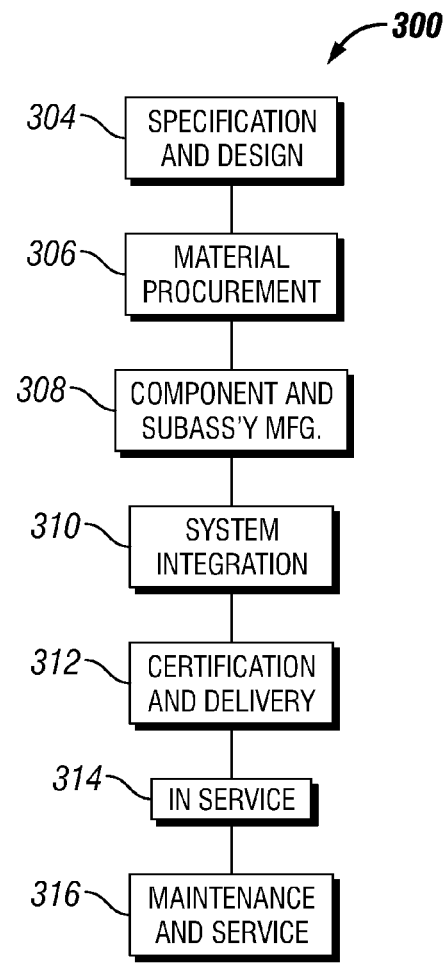
FIG. 6 is a flow diagram of an aircraft production and service methodology.
Figure 7:
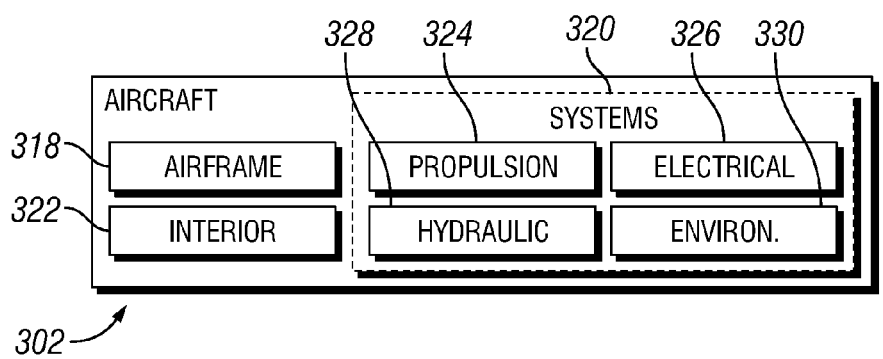
FIG. 7 is a block diagram of an aircraft.

Embodiments of the disclosure may be described in the context of an aircraft manufacturing and service method 300 as shown in FIG. 6, for an aircraft 302 as shown in FIG. 7. During pre-production, exemplary method 300 may include specification and design 304 of the aircraft 302 and material procurement 306. During production, component and subassembly manufacturing 308 and system integration 310 of the aircraft 302 takes place. Thereafter, the aircraft 302 may go through certification and delivery 312 in order to be placed in service 314. While in service by a customer, the aircraft 302 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 7, an aerospace vehicle such as an aircraft 302 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems may be included. Although an aircraft is given as an example of an aerospace application for the present disclosure, it is to be understood that this is only one example of an aerospace application. Additionally, while an aerospace example is shown, the principles of the disclosure may be applied to other industries, such as the automotive industry, for example.

Although various embodiments have been shown and described, the present disclosure is not so limited and will be understood to include all such modifications and variations are would be apparent to one skilled in the art.

What is claimed is:

1. A structure, comprising:
   a structural member configured to bear a load; and
   a stiffness adjustment device coupled to the structural member, the stiffness adjustment device comprising:
      an electrically-powered variable-stiffness layer;
      a conversion layer coupled to the variable-stiffness layer, the conversion layer configured to convert vibrational energy from the structural member into an electrical current, and to supply at least a portion of the electrical current from a first electrode on the conversion layer to a second electrode on the variable-stiffness layer to adjust a stiffness of the variable-stiffness layer; and
      a feedback mechanism comprising a control module to control a flow of electrical current between the first electrode and the second electrode, the feedback mechanism reduces the stiffness of the variable-stiffness layer when the electrical current supplied by the conversion layer is below an optimal amount of current, wherein the portion of the electrical current supplied to the variable-stiffness layer when the electrical current supplied by the conversion layer is at the optimal amount maintains the stiffness of the variable-stiffness layer to produce the optimal amount of current by the conversion layer.

2. The structure of claim 1, wherein the structural member is a portion of a vehicle.

3. The structure of claim 1, wherein the structural member comprises a plurality of bonded layers and wherein the electrically-powered variable-stiffness layer is embedded between two of the plurality of bonded layers of the structure.

4. The structure of claim 1, wherein the variable-stiffness layer has a selectively controllable Young's modulus.

5. The structure of claim 1, wherein the conversion layer is a piezoelectric material.

6. The structure of claim 5, wherein the conversion layer is a mezoporous piezoelectric nanogenerator (MPN) film.

7. The structure of claim 1, wherein the structural member is comprised of a plurality of layers and the stiffness adjustment device is embedded in the structural member between layers of the structural member.

8. The structure of claim 1, wherein the stiffness adjustment device is positioned on a surface of the structural member.

9. The structure of claim 1, wherein the control module is configured to route at least a portion of the electrical current from the stiffness adjustment device to an electrical system of the structure.

10. A device for modifying a stiffness of a load-bearing structure of a vehicle using vibrational energy of the vehicle, comprising:
    a load-bearing structure having a plurality of bonded layers;
    a variable-stiffness layer, having a selectively controllable stiffness, embedded between two of the bonded layers of the load-bearing structure;
    a conversion layer, coupled to the variable-stiffness layer and embedded between two of the bonded layers of the load-bearing structure, the conversion layer configured to convert vibrational energy from the load-bearing structure into an electrical current, and to supply the electrical current to the variable-stiffness layer to adjust a stiffness of the variable-stiffness layer; and
    a control module, configured to control a flow of the electrical current from the conversion layer to the variable-stiffness layer and reduce the stiffness of the variable-stiffness layer when the electrical current supplied by the conversion layer is below an optimal amount of current, wherein the electrical current supplied to the variable-stiffness layer when the electrical current supplied by the conversion layer is at the optimal amount maintains the stiffness of the variable-stiffness layer to produce the optimal amount of current by the conversion layer.

11. The device of claim 10, wherein the control module is configured to route at least a portion of the electrical current to an electrical system of the vehicle.

12. The device of claim 10, wherein the conversion layer is a piezoelectric material.

13. The device of claim 10, wherein the variable-stiffness layer is configured to change the stiffness in only one direction relative to an adjacent bonded layer.

14. The device of claim 10, wherein the load-bearing structure comprises one of a carbon fiber composite panel having a plurality of carbon fiber bonded layers or a fiberglass composite structure having a plurality of fiberglass bonded layers.

15. A method for assembling a structure that uses vibrational energy of the structure to change a stiffness of the structure, comprising:
    selecting a variable-stiffness material;
    attaching a layer of the variable-stiffness material to the structure;
    coupling a conversion layer to the layer of the variable-stiffness material, the conversion layer configured to convert vibrational energy from the structure into an electrical current, and to supply at least a portion of the electrical current from a first electrode on the conversion layer to a second electrode on the variable-stiffness layer to adjust a stiffness of the variable-stiffness layer;
    reducing the stiffness of the variable-stiffness material if the conversion layer does not experience sufficient vibration to convert vibrational energy into an optimal amount of electrical current, wherein the portion of the electrical current supplied to the variable-stiffness layer when the electrical current supplied by the conversion layer is at the optimal amount maintains the stiffness of the variable-stiffness layer to produce the optimal amount of current by the conversion layer; and
    coupling a control module between the second electrode on the variable-stiffness layer and the first electrode on the conversion layer, the control module configured to control a flow of the electrical current from the conversion layer to the variable-stiffness layer and reduce the stiffness of the variable-stiffness layer when the electrical current supplied by the conversion layer is below an optimal amount of current, wherein the electrical current supplied to the variable-stiffness layer when the electrical current supplied by the conversion layer is at the optimal amount maintains the stiffness of the variable-stiffness layer to produce the optimal amount of current by the conversion layer.

16. The method of claim 15, wherein attaching the variable-stiffness layer to the structure comprises one of embedding the variable-stiffness layer in the structure, and positioning the variable-stiffness layer on a surface of the structure.

17. The method of claim 15, wherein the structure comprises a plurality of bonded layers and attaching the layer of the variable-stiffness material to the structure further comprises embedding the layer of the variable-stiffness material between two of the bonded layers of the structure.

18. The method of claim 17, wherein the variable-stiffness layer is configured to change the stiffness in only one direction relative to an adjacent bonded layer.

19. The method of claim 17, wherein the structure comprises one of a carbon fiber composite panel having a plurality of carbon fiber bonded layers or a fiberglass composite structure having a plurality of fiberglass bonded layers.

* * * * *